United States Patent
Fischbach et al.

(10) Patent No.: US 7,044,263 B2
(45) Date of Patent: May 16, 2006

(54) MOTORIZED SYSTEM FOR VEHICLE STEERING

(75) Inventors: Burkhard Fischbach, deceased, late of Schmitten (DE); by Walter Fischbach, legal representative, Freudenberg-Oberfischbach (DE); by Erika Fischbach, legal representative, Freudenberg-Oberfischbach (DE); Joachim Nell, Hanau (DE); Johann Jungbecker, Badenheim (DE); Thomas Rath, Dietzenbach (DE); Peter Schack, Seligenstadt (DE); Oliver Hoffmann, Frankfurt (DE); Steffen Linkenbach, Eschborn-Niederhochstadt (DE); Ronald Bayer, Mülheim/Main (DE); Jurgen Bohm, Oberneisen (DE)

(73) Assignee: Continental Teves AG&CO., OHG, Frankfurt (DE)

( * ) Notice: Subject to any disclaimer, the term of this patent is extended or adjusted under 35 U.S.C. 154(b) by 5 days.

(21) Appl. No.: 10/473,374

(22) PCT Filed: Mar. 28, 2002

(86) PCT No.: PCT/EP02/03537

§ 371 (c)(1),
(2), (4) Date: Sep. 26, 2003

(87) PCT Pub. No.: WO02/076808

PCT Pub. Date: Oct. 3, 2002

(65) Prior Publication Data
US 2004/0104067 A1 Jun. 3, 2004

(30) Foreign Application Priority Data
Mar. 28, 2001 (DE) .................. 101 15 316

(51) Int. Cl.
*B62D 5/04* (2006.01)
(52) U.S. Cl. ..................... 180/444; 180/443
(58) Field of Classification Search .............. 180/444, 180/443
See application file for complete search history.

(56) References Cited

U.S. PATENT DOCUMENTS

| | | | |
|---|---|---|---|
| 4,593,780 A * | 6/1986 | Saito | 180/444 |
| 4,742,882 A * | 5/1988 | Shimizu et al. | 180/444 |
| 4,773,497 A | 9/1988 | Carlson et al. | |
| 5,083,626 A | 1/1992 | Abe et al. | |
| 6,041,885 A | 3/2000 | Watanabe et al. | |
| 6,705,423 B1 * | 3/2004 | Ozsoylu et al. | 180/444 |
| 6,817,437 B1 * | 11/2004 | Magnus et al. | 180/403 |

* cited by examiner

Primary Examiner—Tony Winner (57) ABSTRACT

A drive device of a motor vehicle axle steering module including an electronic rotary drive for displacing a steering rod, wherein the steering rod is assisted drivingly by a transmission device, wherein the displacement of the steering rod causes steerable vehicle wheels to turn, wherein the transmission device includes a supple or twistable clutch or a gear unit with a supple or twistable mounting support.

20 Claims, 8 Drawing Sheets

MOTORIZED SYSTEM FOR VEHICLE STEERING

The present invention relates to a drive device of a motor vehicle axle steering module comprising an electronic rotary drive, by means of which a steering rod can be displaced or at least displacement of the steering rod can be assisted drivingly by the intermediary of a transmission device, with said displacement causing steerable vehicle wheels to turn. The present invention likewise relates to an electromechanical motor vehicle steering system with a drive device of this type.

Recent motor vehicles, in particular passenger cars, are normally equipped with power steering systems used to boost the manual force applied by the driver to the steering hand wheel (steering wheel). It is known in the art to drivingly couple the steerable vehicle wheels to an electronic servomotor as assist in order to reduce the manual force at the steering wheel that is required for the respective steering maneuver. In doing so, radial forces will act on the steering rod due to the travel-responsive inclined positioning of the wheels by way of further intermediate elements such as tie bars coupled to the wheels. Said radial forces produce friction forces in the mounting supports and cause bending of the entire steering rod, whereby the steering function may be disturbed and the efficiency of the system minimized.

An object of the present invention is to provide a drive device of a motor vehicle axle steering module operating with a good overall efficiency and safeguarding a sensitive and jerk-free steering movement of the wheels in spite of the radial forces that act on the steering system and radial deformations of the steering rod (deflections).

According to the invention, this object is achieved in that in a drive device of a motor vehicle axle steering module comprising an electronic rotary drive, by means of which a steering rod can be displaced or at least displacement of the steering rod can be assisted drivingly by the intermediary of a transmission device, with said displacement causing steerable vehicle wheels to turn, the transmission device includes a supple or twistable clutch and/or a gear unit with a supple or twistable mounting support.

Consequently, it is essential for the drive device of the invention that the gear units and/or clutches associated with the transmission device and connected to the steering rod ensure a supple or twistable connection between the steering rod and the rotary drive.

In the drive device of the invention, the overall electromechanical efficiency is optimized by the special driving or bearing concept. High functionality (good response action, comfort, overall efficiency) is achieved with a reasonable effort in manufacture and assembly. In contrast to servo-hydraulic steering systems, the steering aid is produced by means of the electronic rotary drive with coupled gear units or clutches. This permits achieving energetic advantages compared to servo-hydraulic steering systems, thereby allowing the drive device of the invention to be especially favorably employed in small-size vehicles and light-weight vehicles.

In a preferred embodiment of the invention, means is provided for transmitting a driving torque onto the steering rod in a way substantially free from transverse forces.

According to a preferred embodiment of the invention, the steering rod has at least one supple or twistable mounting support.

According to a preferred embodiment of the invention, the transmission devices include a rotation/rotation gear (rot/rot gear) and a rotation-translation gear (rot/trans gear), and means is provided for transmitting a driving torque in a substantially transverse-force-free way from the rotation/rotation gear onto the rotation/translation gear and for the supple or twistable mounting support of the rotation/translation gear.

The rotation/rotation gear is a traction mechanism gear, preferably a toothed-belt drive, according to a favorable aspect of the invention.

The rotation/rotation gear is drivingly connected to the rotation/translation gear by way of a supple or twistable clutch according to a favorable aspect of the invention.

According to a favorable aspect of the invention, the rotation/translation gear is a threaded mechanism with rolling bodies comprising a spindle rod, a number of interposed rolling bodies, and a spindle nut at least partially enclosing said spindle rod.

When a threaded mechanism with rolling bodies is used, a supple torque clutch is drivingly connected to the spindle nut of the threaded mechanism with rolling bodies. Preferably, a ball screw with spherical rolling bodies is used.

It is arranged for according to a preferred embodiment of the invention that the electronic rotary drive is an electric motor that is arranged coaxially to the steering rod axis and includes a motor clutch, with means for transmitting driving torques onto the rotation/rotation gear in a way that is substantially free from transverse forces.

According to a preferred embodiment of the invention, the steering rod of the motor vehicle axle steering module is a toothed rack that is arranged in an axial direction behind the rotation/translation gear and rigidly connected to a component of the rotation/translation gear.

Preferably, an integral steering rod is used that is designed like a spindle rod at least in an area or partial area of the axle steering module and is connected to the encompassing spindle nut by way of interposed rolling bodies.

This object is likewise achieved by an electromechanical motor vehicle steering system with a drive device of the invention, which is characterized in that a mechanical steering gear is provided that is connected to the steering rod in terms of effect and permits the driver of the motor vehicle to transmit a steering torque from the steering wheel to the steering rod.

To take up the produced setting forces on the steering rod, another preferred embodiment of the invention arranges for the steering gear to include a supple or twistable mounting support, preferably a supple or twistable pinion and toothed-rack bearing, and the steering rod includes a supple or twistable mounting support, preferably a linear ball bearing, on the side opposite the steering gear.

According to a preferred embodiment of the invention, steering is directly actuated by the driver of the motor vehicle by means of the mechanical steering gear in the event of failure or malfunction of the electronic rotary drive of the drive device, with components of the transmission device being mechanically entrained.

According to a preferred embodiment of the invention, there is provision of an electronic control unit having an input to receive signals representative of the forces or torques transmitted between steering wheel and steered vehicle wheels, including an evaluation unit for evaluating the signals received, and including a signal generation unit for generating actuation signals for the electronic rotary drive, with a view to reducing the manual effort necessary at the steering wheel for the respective steering maneuver in accordance with the evaluation of the forces or torques transmitted between steering wheel and steered vehicle wheels.

A motor vehicle axle steering module with a drive device of the invention as well as its function will now be explained in detail exemplarily by way of the accompanying illustrations (FIG. 1 to FIG. 14).

Figure 1:
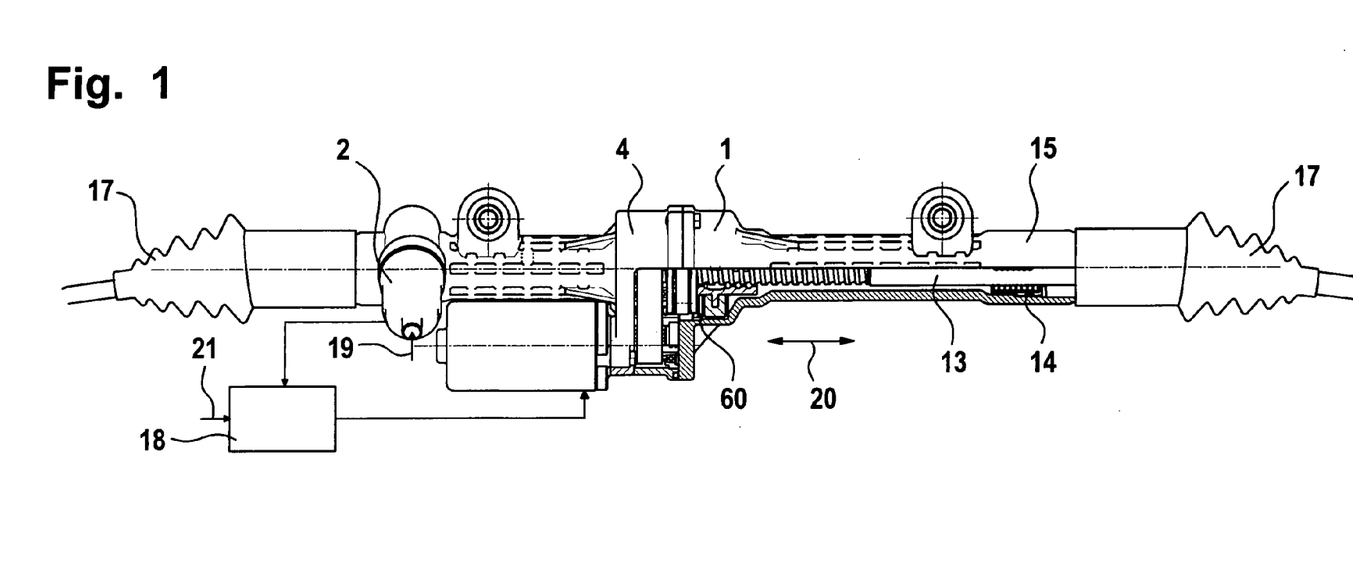
FIG. 1 is a motor vehicle axle steering module with a drive device with a threaded mechanism with rolling bodies as rotation/translation gear.
Figure 2:
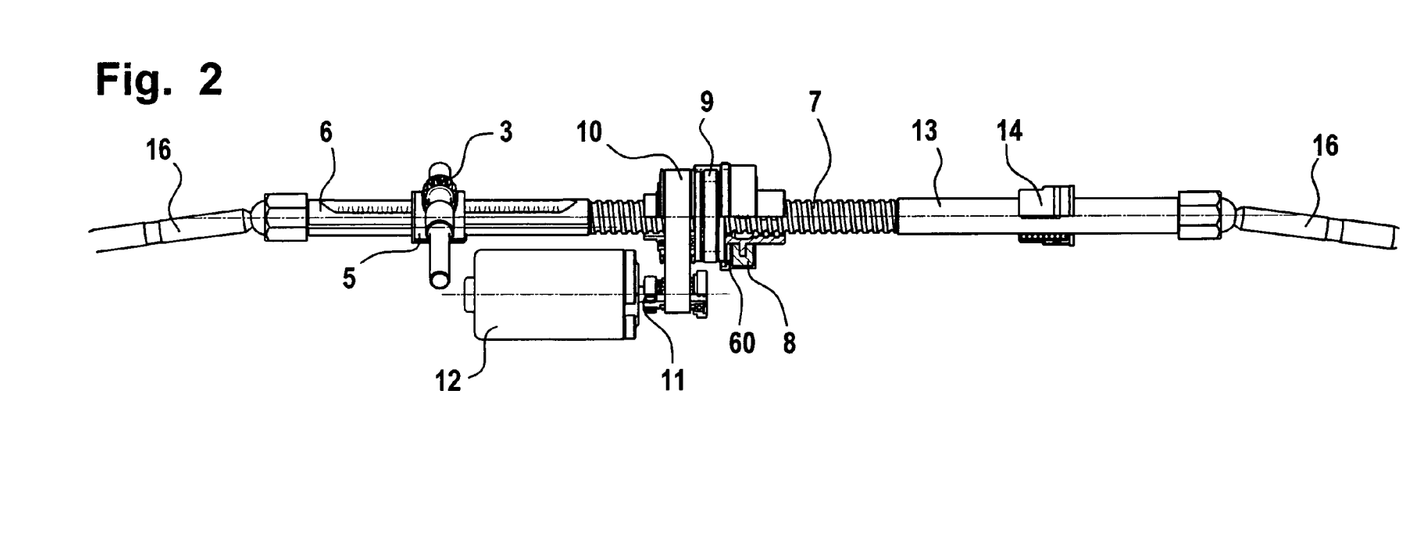
FIG. 2 is a view of the motor vehicle axle steering module shown in FIG. 1, partly without housing.

The total view of the axle steering module is illustrated in FIG. 1 and FIG. 2. The motor vehicle axle steering module (1) includes a right-hand housing (15) and a left-hand housing (4). An electric motor (12) is arranged in the zone of the left housing (4), said motor driving a spindle rod (7) by way of a motor clutch (11), a rotation/rotation gear (10), configured as a toothed-belt drive, a clutch (9), and a rotation/translation gear (8), herein designed as a ball screw. Spindle rod (7) is rigidly connected to a left toothed rack (6) and a right steering rod (13). Toothed rack (6) is mounted in a left-hand toothed-rack mounting support (5). Steering torque (19) sensed by means of a torque sensor (2) is transmitted by way of a driving pinion (3) connected to the steering wheel. The right-hand steering rod (13) is mounted in a right-hand steering-rod mounting support (14). The toothed rack (6) and right-hand steering rod (13) are connected to the steerable wheels by way of tie rods (16), the said connection being sealed by cup seals (17). The torque sensor (2) is used to sense the steering torque (19) introduced by the driver and converted into a corresponding steering aid (20) by way of control electronics (18) and the electric motor (12) and gear (8, 10).

The control unit (18) controls the electric motor (12) in dependence on at least one comparison between nominal and actual values and, possibly, further parameters. To this end, the electric motor (12) is so actuated that an assist moment is executed, causing the actual value of the steering torque sensed by the actual value generator to be adjusted to the steering torque nominal value predetermined by the nominal value generator by way of actuation of the steering actuation device. External interventions (21), especially with respect to e.g. parameter steering, are optional. This renders it possible to modify said nominal value by further parameters in order to at least partly control the disturbing forces that act on the vehicle. Further parameters advantageously are the speed of the vehicle, driving stability, in particular yaw torque or the sideslip angle of the vehicle, road conditions, and/or other influences such as cross wind. Arrangements are made to also integrate a damping function for compensating an excessively vigorous actuation by the driver of the steering actuation device by way of a corresponding control function.

Figure 14:
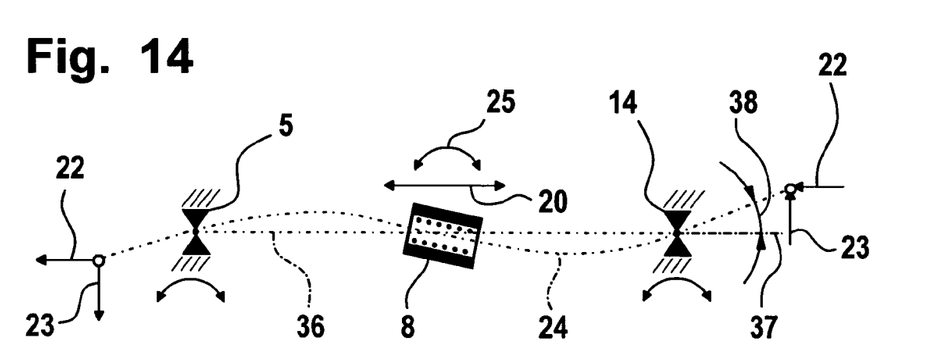
FIG. 14 is a schematic view of the forces acting on the steering rod and a resulting bending of the steering rod when force is applied.

FIG. 14 shows a schematic view of the movements of the steering rod when force is introduced. In the driving concept the radial forces (23) induced by the setting forces (22) and the resulting radial steering rod deformation (24) are uncoupled from the drive train (8–12). According to the invention, the rotation/rotation gear (10) is uncoupled from the pendulum movement (25) of the rotation/translation gear (8) induced by the steering-rod deformation (24) by way of the clutch (9) that is designed to be supple but torsionally resistant.

Figure 3:
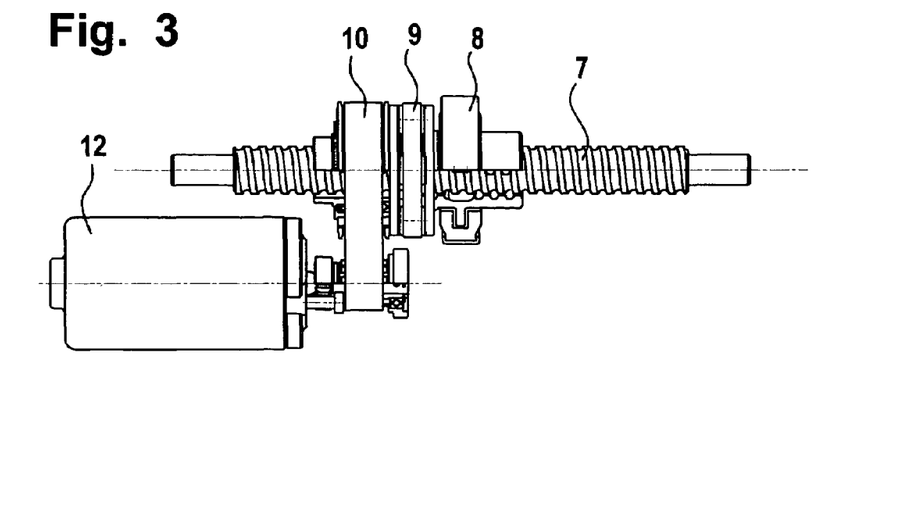
FIG. 3 is a view of the drive device shown in FIG. 1.
Figure 4:
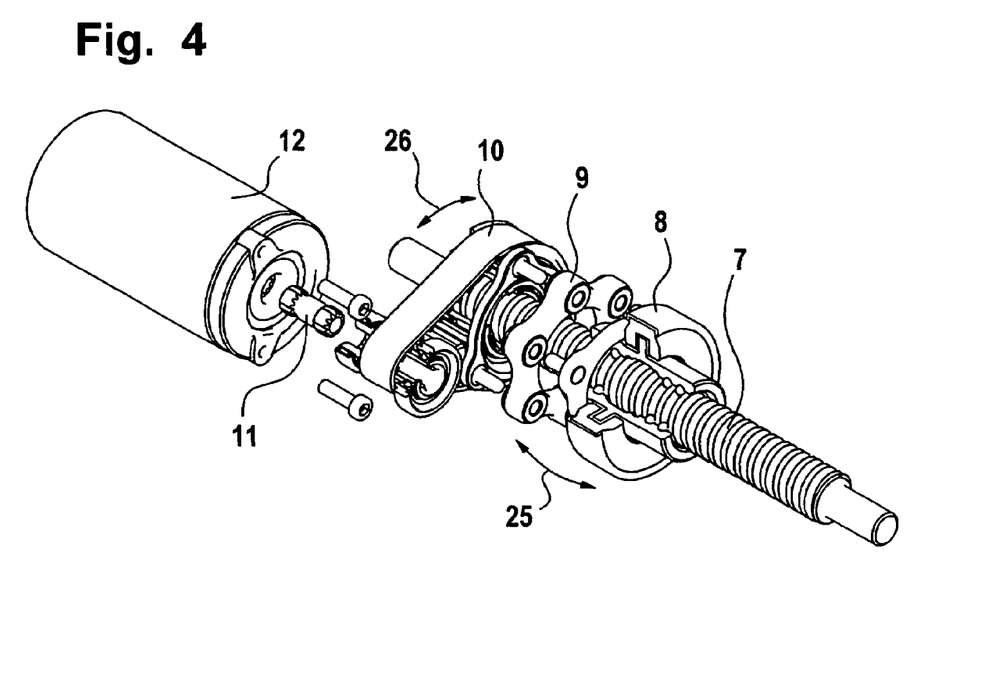
FIG. 4 is a perspective view of the drive device shown in FIG. 3.
Figure 5:
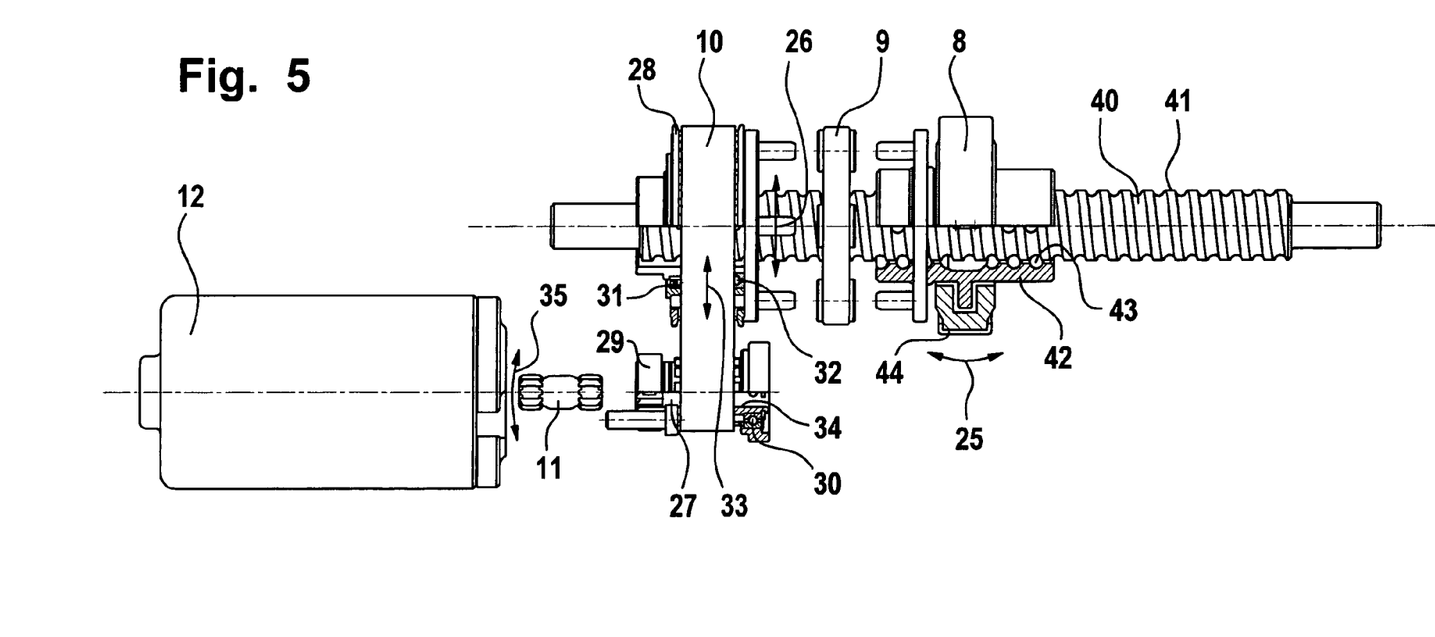
FIG. 5 is an enlarged view of the drive device shown in FIG. 3.

The drive device of the motor vehicle axle steering module shown in FIG. 1 is illustrated in FIG. 3, FIG. 4, and FIG. 5. Basically, the drive device is comprised of the electric motor (12), the motor clutch (11), the rotation/rotation gear (10), the clutch (9), and the rotation/translation gear (8) with spindle rod (7). The corresponding driving torque (26) is transmitted from the rotation/rotation gear (10) onto the rotation/translation gear (8), and mutually disturbing radial forces are uncoupled according to the invention. The rotation/rotation gear (10) includes two crown gears or belt wheels (27, 28) mounted in the left housing (4) by respectively one movable and one immovable bearing (29–32). This allows accommodating the belt forces (33) directly in the housing (4), preventing them from being transmitted to the drive (electric motor (12)) and the output end (clutch (9)).

The electric motor (12) is coupled to the driving shaft (34) of the small crown gear (27) by way of the motor clutch (11), preferably by a crowned multi-tooth shaft, in a manner easy-to-assemble and free from transverse forces.

The driving concept of the invention allows designing each sub-component of the active chain of the drive corresponding to its main function, with the electric motor (12) transmitting only torque, the rotation/rotation gear (10) producing the gear reduction and receiving the belt forces (33), the rotation/translation gear (8) converting a rotational movement into a translational movement and receiving the steering rod forces (22/23) of the two tie rods (16). The rotation/translation gear (8) together with the spindle (7) forms an independent functional subassembly. The rotation/translation gear (8) is preferably a ball screw (39). The ball screw spindle rod (41) includes ball tracks (40). The ball screw spindle rod (41) is connected to the ball screw nut (42) by way of interposed spherical rolling bodies (43) rolling in ball tracks (40).

As has been described hereinabove and is shown in FIG. 14, the steering rod (36) will deform when subjected to the load of the steering rod forces (22, 23), and there will be a corresponding deformation of the steering rod or elastic line (24) depending on the mounting support of the steering rod (36). If the steering rod (36) was prevented from a certain tilt (38) about the imaginary axis (37) caused by a bending resistant mounting support in the bearings (5, 8, 14), high radial forces would be produced partly in the bearings due to the length of the bearings. Said radial forces produced in the bearings can cause poor response behavior and poor mechanical efficiency or lead to failure under extreme loads on the steering rod. In addition, the ball screw (39) would encounter an unsymmetrical stress of the ball tracks (40), minimizing the load capacity and useful life of the ball screw (39).

According to the invention, the rotation/translation gear (8) is so configured in its mounting support that it allows a tilt (38) in a certain area by means of shaping measures of the mounting support at the ball screw nut (42). It does not represent a coaxial rigid connection to the steering rod (36). Thus, the rolling bodies' stress is rendered more uniform, and load capacity and efficiency are increased. This also extends the useful life of the mounting support. Because a clearance-free steering mechanism must be ensured in a steering system, in particular in the zero position (straight travel), the rotation/translation gear (8) is pre-assembled in a mounting case (44) with a defined preload. It forms a subassembly that is easy to integrate at a later time. In addition, all axial component tolerances may be compensated in the assembly of the rotation/translation gear (8) subassembly, thereby relieving the individual components in terms of tolerances. The rotation/rotation gear (10) is an independent subassembly and can be integrated in the left-hand housing (4) in an easy-mount fashion.

Figure 6:
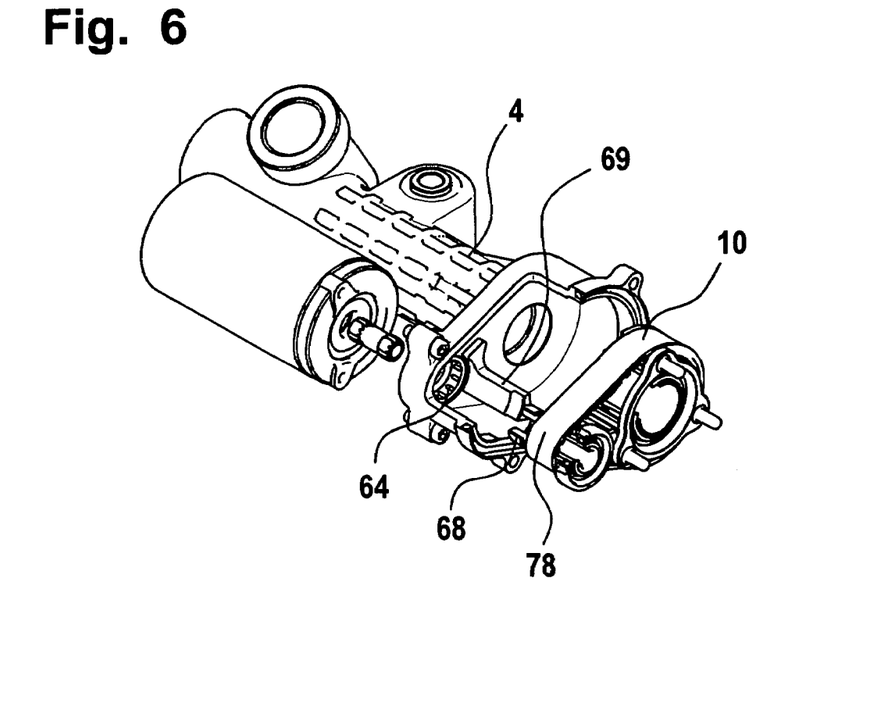
FIG. 6 is a schematic view of a cutout of the drive device with rotary drive and rotation/rotation gear shown in FIG. 3.
Figure 7:
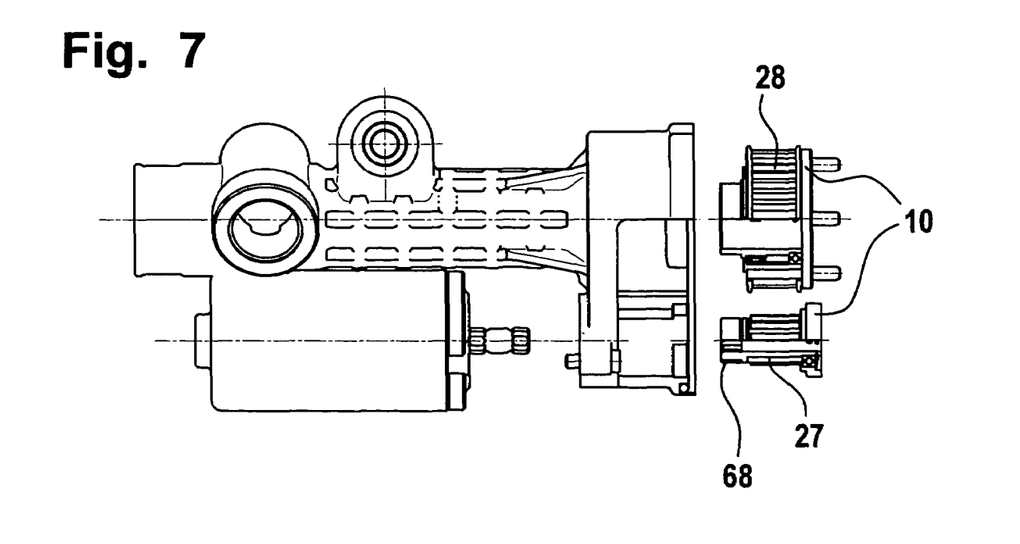
FIG. 7 is a view of the cutout shown in FIG. 6 with individual components of the rotation/rotation gear.
Figure 8:
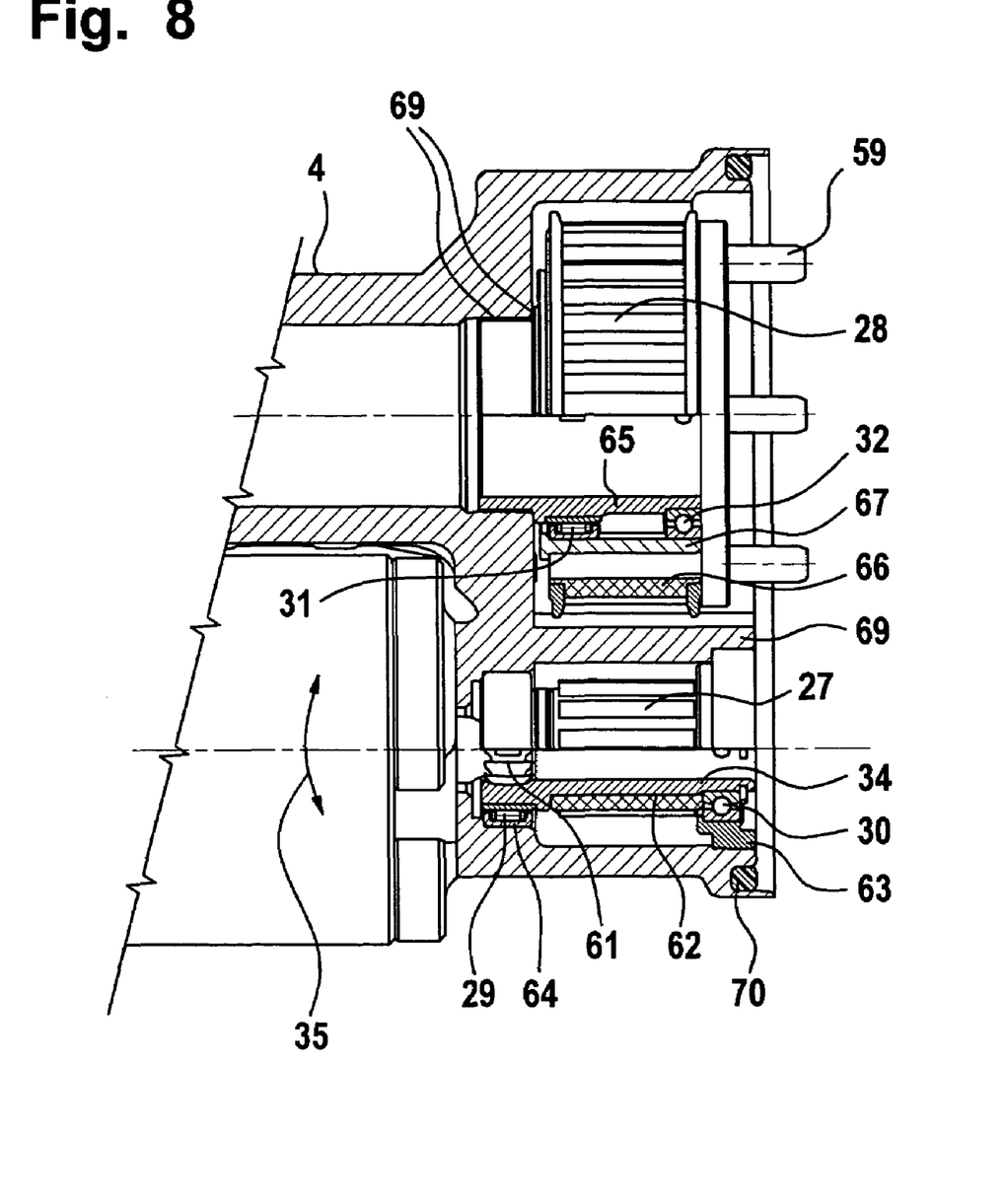
FIG. 8 is an enlarged cross-sectional view of the rotation/rotation gear shown in FIG. 6.

The illustrated rotation/rotation gear (10) (rot/rot gear) is shown in more detail in FIG. 6, FIG. 7, and FIG. 8. The rotation/rotation gear (10) is realized herein by a toothed-belt drive. Other types of gear constructions such as spur gear systems are also feasible. The rotation/rotation gear (10) basically includes the crown gear or belt wheels (27, 28) with movable and immovable bearings (29, 32), the driving shaft (34), a clutch disc (59), a screw ring (60), a gear-tooth system (61), a small crown gear ring (62), a prop ring (63), an outer ring (64), a driven shaft (65), a large crown gear ring (66), a crown gear retaining ring (67), an inner ring of the movable bearing (68), a bearing bracket (69), and a seal (70). The small crown gear (27) is the drive. Said drive is composed of a driving shaft (34) with an integrated gear-tooth system (61) for the driving torque (35) to be transmitted, a small crown gear ring (62), which is e.g. configured as an extruded profile made of any aluminum or plastic material, a movable bearing (29) and an immovable bearing (30) with prop ring (63). Preferably, the outer ring (64) of the movable bearing (29) is already pre-assembled in the left-hand housing (4) for reasons of assembly. The large crown gear (28) is the power output. Said power output is a pre-assembled component and also comprises a driven shaft (65), a large crown gear ring (66), which is e.g. made as an extruded profile of any aluminum or plastic material, a movable bearing (31) and an immovable bearing (32), a crown gear retaining ring (67), and a clutch disc (59) that is positively and operatively connected to the crown gear retaining ring (67).

In the assembly, the clutch disc (59) is calked to the ball screw nut (42) in positive and operative engagement, e.g. by a toothing, according to the assembly process described hereinabove. The entire ball screw gear (8) is subsequently mounted into the left-hand housing (4) in a detachable fashion, preferably by means of a screw ring (60, see FIGS. 1 and 2). However, undetachable calking processes such as clinching are possible as well. In the final assembly of the rotation/rotation gear (10) in the left-hand housing (4), the two crown gears (27/28) are received in an assembly tool with a variable axle base, and the toothed belt (78) is put on without tension. Subsequently, the assembly tool can move expanding mandrels for the crown gears (27/28) to the nominal distance and thereby tension the toothed belt (78) to reach the desired rate of preload. The rotation/rotation gear (10) is introduced in this condition into the left-hand housing (4). The small crown gear (27) bears with the inner ring of the movable bearing (68), by way of the pre-assembled outer ring (64) of the movable bearing and the immovable bearing (30) by way of the prop ring (63) against the left-hand housing (4) by way of the bearing bracket (69). There is no 'floating' mounting support. The driven shaft (65) is screwed into the left-hand housing (4) by an arranged thread and guide collar (69) in a detachable manner, what facilitates a possible belt exchange, or is optionally undetachably clinched. A seal (70) seals both housings (4/15) in the final assembly. A supple (twistable) steering rod mounting support (14) is provided constructively also at this bearing for known reasons.

Figure 9:
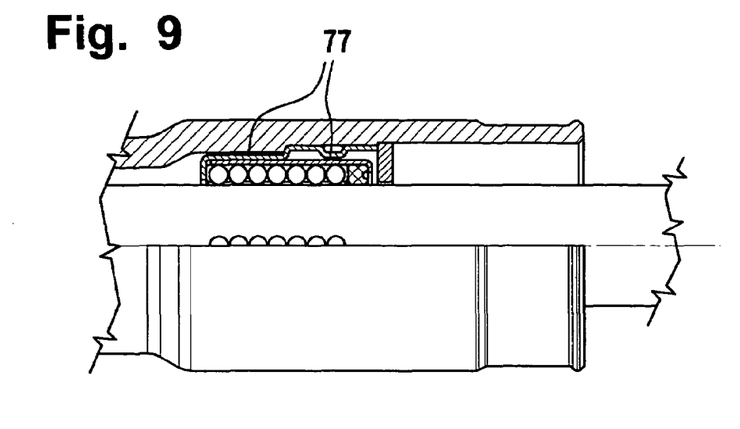
FIG. 9 is a view of the right-hand steering rod mounting support.
Figure 10:
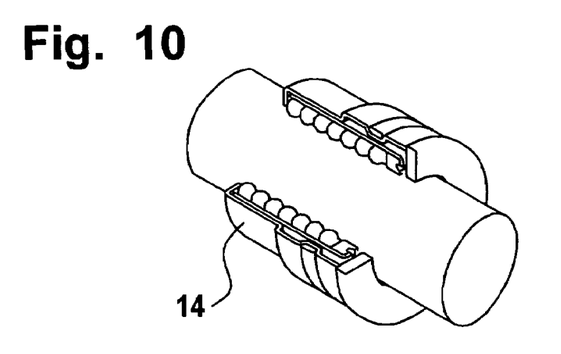
FIG. 10 is a perspective view of the right-hand steering rod mounting support.
Figure 11:
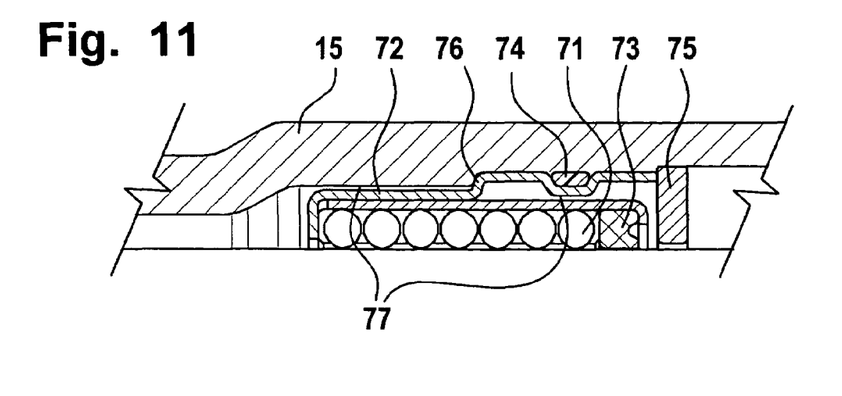
FIG. 11 is an enlarged view of a cutout of the right-hand steering rod mounting support.

The supple steering-rod mounting support (14) is illustrated in detail in FIG. 9, FIG. 10, and FIG. 11. These bearings are torsionally resistant sliding bearings known in the prior art. According to the invention, provision of a linear ball bearing (71) in connection with a supple carrier sleeve (72), a stripper (73), a seal (74) and a mechanical stop (75) is preferred. By shaping (76) the carrier sleeve (72) and integrated clearance (77), the linear ball bearing (71) is able to adapt to the elastic line (by twisting) (24) and simultaneously transmit active radial forces (70) onto the housing (15). It is also arranged for to integrate a conventional sliding bearing into the supple carrier sleeve (72). The alternative design nay become preferred corresponding to the given demands such as the desired efficiency and necessary response action, when the use of a sophisticated linear ball bearing (71) is not necessary. The steering-rod mounting support (14) is a subassembly that can be slipped axially into the right-hand housing (15) and is locked with the stop (75) in the housing (15).

Figure 12:
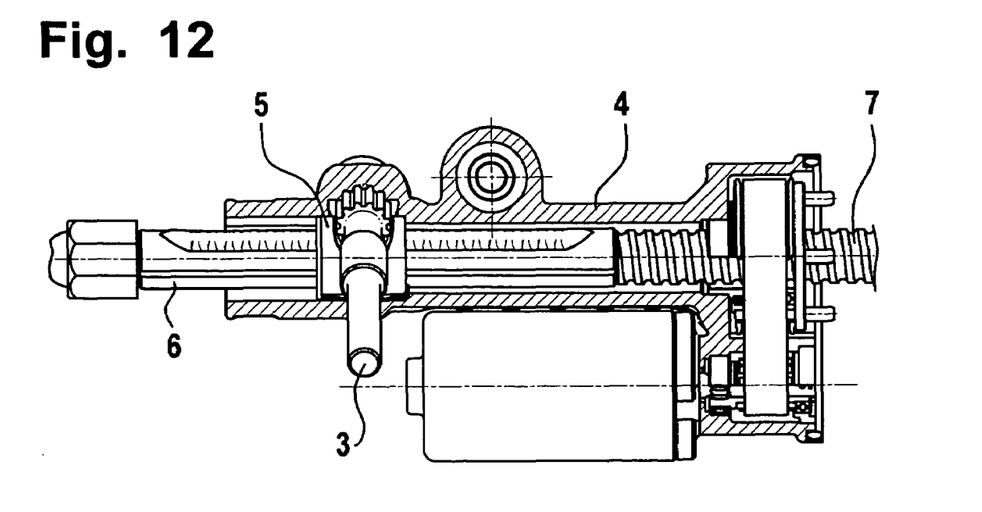
FIG. 12 is a view of the left-hand side of the motor vehicle axle steering module, as shown in FIG. 1, with pinion/steering-rod mounting support.
Figure 13:
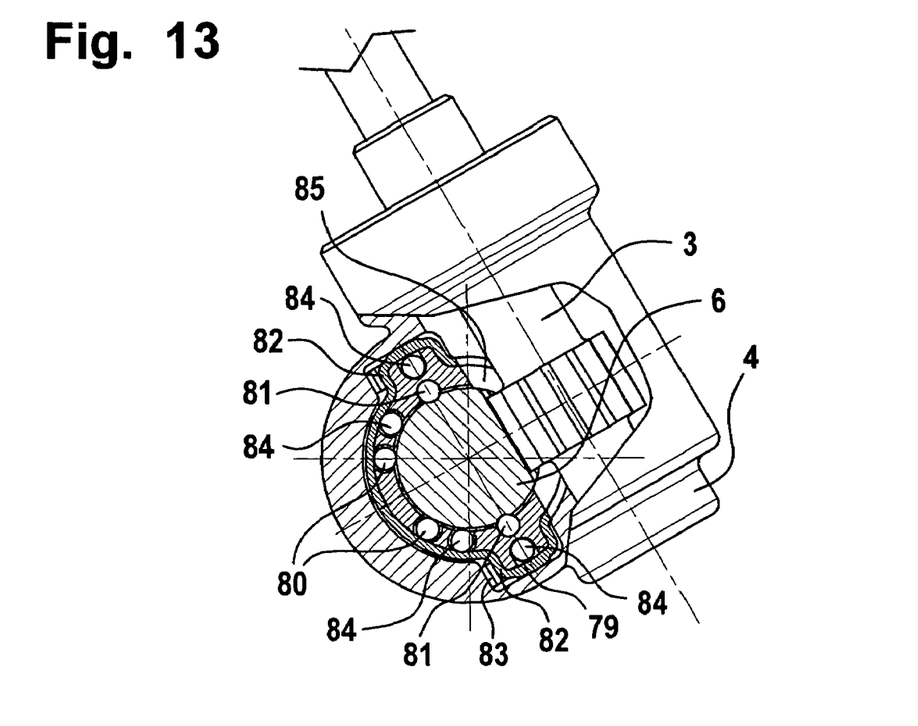
FIG. 13 is an enlarged view of the pinion/steering-rod mounting support.

The left-hand pinion/steering-rod mounting support is illustrated more closely in FIG. 12 and FIG. 13. In the state of the art the steering rod is urged in a clearance-free manner against the pinion by way of a spring-loaded spherical cap, in positive and frictional engagement therewith. According to the invention, a supple pinion/steering-rod mounting support (5) is provided also at this bearing (5) for the mentioned reasons. Arrangements are made that this mounting support (5) fulfils a multiple function: a clearance-free coupling between pinion (3) and toothed rack (6), a torque support of the driving torque of the ball screw spindle (7), and a friction-optimized supple linear guide of the toothed rack (6) is provided. The illustrated pinion/steering-rod mounting support (5) displays these mentioned functions and, in addition, favorably is a subassembly that is easy to integrate into housing (4).

The pinion/steering-rod mounting support (5) is a combination of a linear ball bearing (80) integrated in a bearing housing (79) and an anti-rotation mechanism (81). The bearing housing (79) and, hence, the entire pinion/steering-rod mounting support (5) is supported on an integrated shoulder (82) of the housing (4) in a radial direction and supple manner due to integrated preloaded springs (83) and thereby produces a clearance-free connection between driving pinion (3) and toothed rack (6). Simultaneously, the spring takes care of supporting the driving torque, with part of the driving torque being directly supported by way of the pinion. The ball recirculation systems (84) are integrated in the housing (79). The housing is open on one side, and thus assembly of the driving pinion (3) is easily possible. The above described pinion/steering-rod mounting support (5) is a subassembly that can be slipped in an axial direction into the left-hand housing (4) and is locked by a stop (85) in the housing (4).

On the whole, the supple and decoupled driving and bearing concept of the steering rod according to the invention achieves a very good overall efficiency and a very good response action of the steering system. The combination of the transverse-force-free torque transmission between rotation/rotation and rotation/translation gears, the supply supported ball screw, the supple right-hand linear bearing and the supple left-hand toothed-rack and pinion mounting support achieve an optimized system performance.

LIST OF REFERENCE NUMERALS

Motor vehicle axle steering module (1)
Torque sensor (2)
Driving pinion (3)
Left-hand housing (4)
Left toothed rack mounting support (5)
Left toothed rack (6)
Spindle rod (7)
Rotation/translation gear (with axial bearing) (8)
Clutch (9)
Rotation/rotation gear (toothed-belt drive) (10)
Motor clutch (11)
Electric motor (12)
Right steering-rod mounting support (14)
Right-hand housing (15)
Tie rods (16)
Cup seals (17)
Control electronics (18)
Steering torque (19)
Steering aid (20)
External interventions (21)
Setting forces (22)
Radial forces (23)
Steering-rod deformation or elastic line (24)
Pendulum motion (25)
Driving torque (26)
Crown gears or belt wheels (27/28)
Movable and immovable bearings (29–32)
Belt forces (33)
Driving shaft (34)
Driving torque (35)
Steering rod (36)
Imaginary axis (37)
Tilt (38)
Ball screw gear (39)
Ball screw ball tracks (40)
Ball screw spindle rod (41)
Ball screw nut (42)
Ball screw rolling bodies (43)
Mounting case (44)
Clutch disc (59)
Screw ring (60)
Gear-tooth system (61)
Small crown gear ring (62)
Prop ring (63)
Outer ring (64)
Driven shaft (65)
Crown gear ring (66)
Crown gear retaining ring (67)
Inner ring of the movable bearing (68)
Bearing bracket (69)
Seal (70)
Linear ball bearing (71)
Carrier sleeve (72)
Stripper (73)
Seal (74)
Mechanical stop (75)
Shaping (76)
Integrated clearance (77)
Toothed belt (78)
Bearing housing (79)
Linear ball bearing (80)
Anti-rotation mechanism (81)
Shoulder (82)
Preloaded springs (83)
Ball recirculation system (84)
Stop (85)

The invention claimed is:

1. A power steering module, comprising:
an electronic rotary drive,
a transmission device, coupled to said electronic rotary drive, wherein said transmission device includes a first twistable clutch coupled to a steering rod,
wherein the transmission device further includes a rotation/rotation gear a rotation-translation gear, and means for transmitting a driving torque in a substantially transverse-force-free way from the rotation/rotation gear onto the rotation/translation gear, wherein the rotation/rotation gear is connected to the rotation/translation gear in terms of driving by way of a second twistable clutch.

2. Drive device as claimed in claim 1, further including means is provided for transmitting a driving torque onto the steering rod in a way substantially free from transverse forces.

3. Drive device as claimed in claim 1, wherein the steering rod has at least one supple or twistable mounting support.

4. Drive device as claimed in claim 1, wherein the transmission device includes a rotation/rotation gear and a rotation-translation gear, and means for transmitting a driving torque in a substantially transverse-force-free manner from the rotation/rotation gear onto the rotation/translation gear.

5. Drive device as claimed in claim 1, wherein the transmission device includes a rotation/rotation gear and a rotation-translation gear, and in that means is provided for transmitting a driving torque in a substantially transverse-force-free way from the rotation/rotation gear onto the rotation/translation gear and for the supple or twistable mounting support of the rotation/translation gear, wherein the rotation/rotation gear is a traction mechanism gear.

6. Drive device as claimed in claim 1, wherein the transmission device includes a rotation/rotation gear, a rotation-translation gear, and means for transmitting a driving torque in a substantially transverse-force-free way from the rotation/rotation gear onto the rotation/translation gear, wherein the rotation/translation gear is a threaded mechanism with rolling bodies including a spindle rod, a plurality of interposed rolling bodies, and a spindle nut at least partially enclosing said spindle rod.

7. Drive device as claimed in claim 1, wherein the electronic rotary drive further includes an electric motor having a rotary output shaft, wherein a rotary axis of said rotary shaft is arranged generally parallel to a steering rod axis and wherein said electric rotary drive includes a motor clutch, said motor clutch including means for transmitting driving torques onto the rotation/rotation gear substantially free from transverse forces.

8. Drive device as claimed in claim 1, wherein the transmission device includes a rotation/rotation gear, a rotation-translation gear, and means for transmitting a driving torque in a substantially transverse-force-free way from the rotation/rotation gear onto the rotation/translation gear, wherein the steering rod includes, in part, a toothed rack at is arranged in an axial direction of said steering rod.

9. Electromechanical motor vehicle steering system, comprising:
an electronic rotary drive, a transmission device coupled to the electronic rotary drive, wherein said transmission device includes a twistable clutch coupled to a steering rod,
a mechanical steering gear connected to the steering rod wherein the steering rod permits a vehicle driver to transmit a steering torque from a steering wheel to the steering rod further including,
an electronic control unit having an input to receive signals representative of the forces or torques transmitted between steering wheel and steered vehicle wheels, including an evaluation unit for evaluating the signals received, and including a signal generation unit for generating actuation signals for the electronic rotary drive, with a view to reducing the manual effort necessary at the steering wheel for the respective steering maneuver in accordance with the evaluation of the forces or torques transmitted between steering wheel and steered vehicle wheels.

10. Electromechanical motor vehicle steering system of claim 9, wherein the mechanical steering gear includes a twistable mounting support, and wherein the steering rod includes a twistable mounting support on a side opposite the steering gear.

11. Electromechanical motor vehicle steering system of claim 9, wherein the vehicle steering is directly actuated by the driver of the motor vehicle by means of the mechanical steering gear in the event of failure or malfunction of the electronic rotary drive of the drive device, wherein components of the transmission device are entrained mechanically.

12. A power steering module, comprising:
an electronic rotary drive,
a transmission device, coupled to said electronic rotary drive, wherein said transmission device includes a first twistable clutch coupled to a steering rod, wherein the electronic rotary drive further includes an electric motor having a rotary output shaft, wherein a rotary axis of said rotary shaft is arranged generally parallel to a steering rod axis and wherein said electric rotary drive includes a motor clutch, said motor clutch including means for transmitting driving torques onto the rotation/rotation gear substantially free from transverse forces.

13. A power steering module, comprising:
an electronic rotary drive,
a transmission device, coupled to said electronic rotary drive, wherein said transmission device includes a first supple clutch coupled to a steering rod wherein said supple clutch uncouples any pendulum movement of the transmission device induced by the steering rod.

14. Drive device as claimed in claim 13, further including means is provided for transmitting a driving torque onto the steering rod in a way substantially free from transverse forces.

15. Drive device as claimed in claim 13, wherein the steering rod has at least one supple or twistable mounting support.

16. Drive device as claimed in claim 13, wherein the transmission device includes a rotation/rotation gear and a rotation-translation gear, and means for transmitting a driving torque in a substantially transverse-force-free manner from the rotation/rotation gear onto the rotation/translation gear.

17. Drive device as claimed in claim 13, wherein the transmission device includes a rotation/rotation gear and a rotation-translation gear, and in that means is provided for transmitting a driving torque in a substantially transverse-force-free way from the rotation/rotation gear onto the rotation/translation gear and for the supple or twistable mounting support of the rotation/translation gear, wherein the rotation/rotation gear is a traction mechanism gear.

18. Drive device as claimed in claim 13, wherein the transmission device further includes a rotation/rotation gear, a rotation-translation gear, and means for transmitting a driving torque in a substantially transverse-force-free way from the rotation/rotation gear onto the rotation/translation gear, wherein the rotation/rotation gear is connected to the rotation/translation gear in terms of driving by way of a second twistable clutch.

19. Drive device as claimed in claim 13, wherein the transmission device includes a rotation/rotation gear, a rotation-translation gear, and means for transmitting a driving torque in a substantially transverse-force-free way from the rotation/rotation gear onto the rotation/translation gear, wherein the rotation/translation gear is a headed mechanism with rolling bodies including a spindle rod, a plurality of interposed rolling bodies, and a spindle nut at least partially enclosing said spindle rod.

20. Drive device as claimed in claim 13, wherein the electronic rotary drive further includes an electric motor having a rotary output shaft, wherein a rotary axis of said rotary shaft is arranged generally parallel to a steering rod axis and wherein said electric rotary drive includes a motor clutch, said motor clutch including means for transmitting driving torques onto the rotation/rotation gear substantially free from transverse forces.

* * * * *